United States Patent
Molins et al.

(10) Patent No.: US 9,171,657 B2
(45) Date of Patent: Oct. 27, 2015

(54) GLASS FOR INSULATING COMPOSITION

(75) Inventors: Laurent Molins, Souppes sur Loing (FR); Jerome Lalande, Saint-Maur des Fosses (FR); Jean-Yves Leblais, Souppes sur Loing (FR); Alix Arnaud, Montrouge (FR); Claude Da Silva, Aulnay Sous Bois (FR)

(73) Assignee: SAINT-GOBAIN QUARTZ S.A.S., Courbevoie (FR)

( * ) Notice: Subject to any disclaimer, the term of this patent is extended or adjusted under 35 U.S.C. 154(b) by 632 days.

(21) Appl. No.: 13/394,871

(22) PCT Filed: Sep. 14, 2010

(86) PCT No.: PCT/FR2010/051904
§ 371 (c)(1),
(2), (4) Date: Mar. 8, 2012

(87) PCT Pub. No.: WO2011/033214
PCT Pub. Date: Mar. 24, 2011

(65) Prior Publication Data
US 2012/0171420 A1    Jul. 5, 2012

(30) Foreign Application Priority Data

Sep. 17, 2009 (FR) .................................... 09 56385
May 18, 2010 (FR) .................................... 10 53832

(51) Int. Cl.
*C03C 8/02* (2006.01)
*H01B 3/08* (2006.01)
*C03C 3/064* (2006.01)
(Continued)

(52) U.S. Cl.
CPC ................ *H01B 3/085* (2013.01); *C03C 3/064* (2013.01); *C03C 3/066* (2013.01); *C03C 4/16* (2013.01); *C03C 14/004* (2013.01); *H01B 3/087* (2013.01); *C03C 2214/30* (2013.01); *Y10T 428/24355* (2015.01); *Y10T 428/31511* (2015.04);
(Continued)

(58) Field of Classification Search
CPC .............. C03C 8/14; C03C 8/22; C03C 8/24; C03C 8/245; C03C 8/02
USPC ......................................... 501/15, 16, 17, 21
See application file for complete search history.

(56) References Cited

U.S. PATENT DOCUMENTS 2,669,764 A * 2/1954 Kilpatrick .................. 264/328.5
3,271,638 A * 9/1966 Murad .......................... 257/660
(Continued)

FOREIGN PATENT DOCUMENTS

JP           63 79740        4/1988
JP           1 111772        4/1989

OTHER PUBLICATIONS

International Search Report Issued Dec. 17, 2010 in PCT/FR10/51904 Filed Sep. 14, 2010.

*Primary Examiner* — Noah Wiese
(74) *Attorney, Agent, or Firm* — Oblon, McClelland, Maier & Neustadt, L.L.P.

(57) ABSTRACT

The invention relates to a composition comprising mica and glass, said glass comprising:
  10 to 30 mol % of $SiO_2$
  5 to 40 mol % of BaO
  15 to 30 mol % of $B_2O_3$,
the sum of the concentrations of zinc oxide, alkali metal oxide and alkaline earth oxide in the glass extending from 15 to 65 mol %.
This composition is intended to be molded at a temperature above the Tg of the glass so as to form composite parts that can serve as an electrical insulator.

17 Claims, 1 Drawing Sheet

(51) Int. Cl.
*C03C 3/066* (2006.01)
*C03C 4/16* (2006.01)
*C03C 14/00* (2006.01)

(52) U.S. Cl.
CPC .. *Y10T428/31612* (2015.04); *Y10T 428/31645* (2015.04)

(56) References Cited

U.S. PATENT DOCUMENTS

2005/0231118 A1* 10/2005 Fujimine et al. .............. 313/586
2006/0276322 A1   12/2006 Hasegawa et al.

* cited by examiner

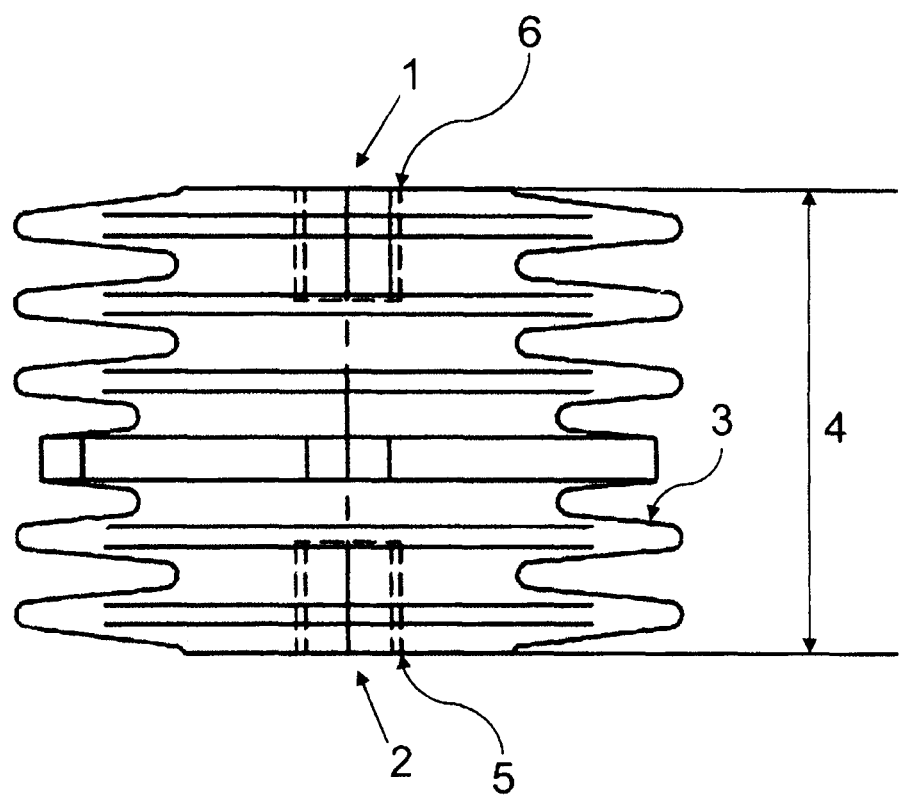

GLASS FOR INSULATING COMPOSITION

The invention relates to a composition and a material comprising a glass and mica for producing a composite material with a glass matrix, notably for the purpose of insulating electrical conductors.

Many electrically conducting parts need to be insulated electrically by a heat-resistant electrical insulator and, where required, need to resist shocks or vibrations. This is notably the case for electrical parts placed in the engine environment of the locomotives of trains, notably brake rheostats. For this type of application, the insulator should generally show sufficient resistance to at least 150° C. and more often at least 200° C. or even at least 450° C. As other examples of the parts concerned, mention may be made of bulb caps, flame detectors, plugs for internal combustion engines, igniters, oxygen probes (for measuring the amount of oxygen in engines and for participating in regulating combustion) or high tension cable insulators.

In the prior art, in order to produce this insulator, a material is used comprising a matrix of lead borate or lead glass filled with mica. The parts are made by the following succession of steps:

weighing and mixing various constituents of the mixture: glass (called "glass frit") or constituents enabling glass+mica+optionally alumina to be synthesized, producing pellets of said mixture by uniaxial compression, possibly adjusting the weight of the pellets by machining, a possible step of sintering the pellets in order to give them mechanical strength, fusing the pellets in a rotating or through-type furnace.

It is a matter of reaching a temperature that is sufficiently above the glass transition temperature (Tg) of glass, sufficiently high so that the viscosity of glass (alone) lies between $1\times10^2$ and $1\times10^3$ dPa·s. The Tg may be measured by dilatometry and corresponds to the temperature of the upper annealing point for which the decimal logarithm of the viscosity (or dPa·s) is 13. The standard NF B30-105 is applied.

Compression and transfer methods may be distinguished. Heated pellets of the mixture are used for these two methods. In the method in compression, the pellets are placed directly in the mold cavity and are uniaxially pressed. In the transfer method, suitable for smaller parts, a mold is used provided with transfer channels for injecting the molten mixture. According to this method, the pellets are placed in the mold and uniaxially pressed, which causes the material to be injected into the channels leading to the molding cavities. In these two methods, it is necessary to ensure that, at the working temperatures, mica does not degrade in contact with the vitreous matrix, so that its mechanical and electrical properties, that are essential to the application concerned, are preserved.

Mica is a mineral filler improving the electrical (notably dielectric) and mechanical properties and facilitates molding. The part molded from the mixture comprising mica and glass is a composite material in which the mica particles are covered with a glass matrix. It is also possible to add a mineral filler to the mixture, such as notably alumina, strontium oxide, zirconia, mullite, refractory fibers made of glass or ceramic. This mineral filler remains in the final part in the form an inclusion in the same way as mica does. This filler, by virtue of a Tg (glass transition temperature) above 600° C. thus does not mix with glass in the matrix of the composite during the processing procedure. The particles of this filler may possibly be deformed during the processing procedure but remain included in the form of particles in the final part.

The molded composite parts are then coated with an organic mixture in order to protect them against humidity and/or weather. It substantially increases insulating resistance and electrical rigidity. In the case of lead-containing insulating compositions of the prior art, the coating is of the silicone type.

Since lead is considered as toxic, new glasses should be found capable of replacing those containing it within the framework of the production of electrical insulators. The composition of the insulator should have an insulating resistance under 1 kV greater than 1 TΩ (teraohm) for more than 72 hours of immersion in deionized water.

Lead-free glass frits containing the usual oxides such as $SiO_2$, $P_2O_5$, $Al_2O_3$, CaO, MgO, $Na_2O$, and $K_2O$ do not combine good molding ability at a temperature below 850° C. and preferably below 800° C. (mixed with mica and possibly alumina) with the maintenance of good electrical and mechanical performance in wet ageing.

Notably, some glass frit rich in alkalis (such as Ferro GL57 or VTR298) mixed with 60% by weight of mica and 5% of alumina (in compression) can be molded between 670° C. and 780° C. respectively. Within the framework of the transfer method, these same frits, mixed with 30% by weight of mica and 10% of alumina can be molded between 800 and 950° C. However, even under the most favorable conditions (i.e. with the most effective organic coating) the insulating resistance remains greater than TΩ for only 2 h of immersion in water. The limited durability of these systems is attributed to the very low hydrolytic resistance of the frit used. Finally, even with the large amounts of alkalis by which they are characterized (20-30 mol % in oxide base), molding cannot be carried out at a temperature as low as that with lead frit (625° C.), this due to the fact that the viscosity is too high.

In addition, in spite of the low glass transition temperature (280° C.) and annealing temperature (480-490° C.) when they are used alone, frits based on tin phosphate of the Asahi KF9079 or KP311 type, known as being the least hygroscopic among phosphate glasses, cannot be molded with mica or even alumina in as much as the molten material injects poorly into a mold and does not follow its walls well.

Addition of a mineral filler with a Tg above 600° C. and preferably alumina, is preferred (for example 5% by weight for the compression method; for example 15% by weight for the transfer method) in order to limit cracking when molding or cooling the parts based on frits of the Ferro GL57 or VTR298 type, a mismatch of the thermal expansion existing between the corresponding vitreous binder/mica mixture and the steel of the inserts (CTE=$17\times10^{-6}K^{-1}$).

A search is made to have a coefficient of thermal expansion (CTE) for the composition that is as close as possible to that of steel, namely between 14 and $18\times10^{-6}K^{-1}$.

In a certain number of applications such as brake rheostats in the rail industry, parts may be subjected to thermal shocks (temperature rise of the ambient temperature up to 200 or even 350° C. in a few seconds) and the insulating composition should therefore be particularly effective from this point of view. These insulators may also be subjected to external weather (rain, snow etc) in this way provoking high thermal shock stresses.

The invention overcomes the abovementioned problems. A lead-free glass (that is less than 0.011 mol % of PbO in the glass) has been found having a low molding temperature and good resistivity performance in water.

The glass used within the framework of the invention (in a composition additionally including mica) comprises:

10 to 30 mol % of $SiO_2$ 5 to 40 mol % of BaO 15 to 30 mol % of $B_2O_3$ the sum of the concentrations of zinc oxide ZnO, alkali metal oxides $R_2O$ and alkaline earth oxides R'O in the glass extending from 15 to 65 mol %, notably 35 to 65 mol %. The definition of this composition implies that the glass may or may not contain ZnO. The sum of the concentration of zinc oxide ZnO, alkali metal oxides $R_2O$ and of alkaline earth oxides R'O includes the concentration of BaO (which is an R'O) which should moreover be present in an amount of 5 to 40 mol %.

When it is said that the glass contains a compound, it is in the dissolved state in the glass.

Preferably, the glass contains more than 20 mol % of BaO.

Preferably, the glass used within the framework of the invention contains bismuth oxide. For reasons essentially of cost, it is preferable to put in the least possible, and it is possible to put in less than 15% within the framework of the present invention. $Bi_2O_3$ may be present in an amount of 0.5 to 15% and preferably 1 to 12 mol %. $Bi_2O_3$ is particularly costly and it has been verified that it is even possible to obtain excellent results with less than 10 mol % of $Bi_2O_3$.

The glass used within the framework of the invention need not contain an alkali metal oxide. It may also contain it, generally up to 15 mol % without it harming the insulation resistance on immersion in water. Notably, it may contain 5 to 15 mol % of $Na_2O$.

The glass used within the framework of the invention may contain an inorganic compound of the oxide type with a Tg above 600° C., notably alumina $Al_2O_3$, generally to 5% and preferably 1 to 5 mol % of inorganic compound. This compound is dissolved in the starting glass and therefore may be clearly distinguished from the mineral filler introduced beside the glass in the composition according to the invention.

The glass used within the framework of the invention may contain lanthanum oxide, and in this case, generally 0 to 6 mol % of $La_2O_3$.

The glass used within the framework of the invention may or may not contain lithium oxide. Preferably, the sum of the molar content of $Li_2O$ and the molar content of $B_2O_3$ is less than 45 mol %. Lithium oxide ($Li_2O$) may in some cases be the origin of corrosion problems for refractories when the frit is melted, in which case it may be preferable to reduce its level to less than 15 ml % or even 10 mol %, or even less than 8 mol %.

The glass used within the framework of the invention may contain up to 8 mol % of fluorine (considered as elementary F) in the form for example of cryolite or barium or calcium fluoride, as a fluidizing agent that has little effect on durability. This addition also makes it possible to reduce the viscosity of the glass/mineral filler mixture representing a reduction in temperature of the order of 50° C. and also the molding temperature of the mixture comprising glass and mica.

The glass used within the framework of the invention is employed within the framework of an insulating composition (glass+mica) within the framework of the compression or transfer method in the following proportions:
  35 to 75%, preferably 45 to 65% by weight of glass,
  20 to 65% and preferably 25 to 55% by weight of mica,
  0 to 15% and preferably 4 to 12% by weight of mineral filler with a Tg above 600° C.

The glass used within the framework of the invention is employed within the framework of an insulating composition (glass+mica) within the framework of the compression method, preferably in the following proportions:
  35 to 65%, preferably 45 to 55% by weight of glass,
  25 to 65% and preferably 45 to 55% by weight of mica,
  0 to 15% and preferably 4 to 8% by weight of mineral filler with a Tg above 600° C.

The glass used within the framework of the invention is employed within the framework of an insulating composition (glass+mica) within the framework of the transfer method, preferably in the following proportions:
  45 to 75%, preferably 55 to 65% by weight of glass,
  20 to 40% and preferably 25 to 35% by weight of mica,
  0 to 15% and preferably 8 to 12% by weight of mineral filler with a Tg above 600° C.

Preferably, any alumina used as a mineral filler with a Tg above 600° C. (filler not included in the starting glass) is a calcined alumina such as AC45 from Alcan (transfer and compression methods).

The invention relates to the powdered composition in a state where it is a mixture of powders (glass frit+mica+possibly a mineral filler with a Tg above 600° C.) and the method for obtaining a material by heat treatment (melting the glass at generally below 1200° C., generally between 600 and 1100° C.) and then cooling the powdered composition. In this way, the invention also relates to the method for obtaining a composite material comprising mica particles and a glass matrix, comprising heat treating a composition of one of the preceding claims in the powdered state, said heat treating taking place at a temperature such that the viscosity of the glass lies between $1 \times 10^2$ and $1 \times 10^3$ dPa·s. In the powdered composition, mica (equivalent mean diameter extending from 100 to 600 μm) and glass (equivalent mean diameter extending from 20 to 300 μm) are in the form of a powder or particles. According to the temperature employed, it is possible to have interdiffusion of the elements at the interfaces between the filler (especially mica) and the glass matrix. Overall, and especially for low processing temperatures, the glass between the particles of mica and possibly the particles of a mineral filler with a Tg above 600° C. keeps the composition that it had in the frit state. The invention also relates to the composition in the form of a composite material of which the glass forms the matrix surrounding the particles of mica and possibly another mineral filler.

A part formed from the insulating composition (glass+mica) according to the invention is coated with an organic coating. The organic coating is generally of the polysiloxane or epoxy or polyurethane or polysilazane type. In the case of an insulator that is not directly subjected to the weather, a coating is applied, preferably derived from a hydrophobic silane of the alkylalkoxysilane or fluorosilane type, more particularly n-octyltriethoxysilane (alkyl Dynasylan® OCTEO) which makes it possible to preserve the insulating resistance properties in an atmosphere with more than 50% relative humidity and notably more than 93% relative humidity. An alkylalkoxysilane is hydrolyzed at the surface and a polysiloxane is derived from this, forming the coating. Silane is used in a pure form or in an aqueous or alcoholic solution, and is applied by immersing the molded object, without the need for cleaning any insert (metallic or ceramic) after the operation. The coating is then dried by heat treatment (generally between 80 and 170° C.). The hydrolysis time and the curing time (generally from 15° C. to 250° C.) may be optimized in order to achieve the desired performance on immersion in water. The following silanes, dried at a temperature of 150° C. also give excellent results:
  alkyl Dynasylan® IBTEO isobutyltriethoxysilane
  Dynasylan® SIVO CLEAR hydro-/oleophobic treatment, 2-component in alcohol.
  Also possible as silanes are:
  SIVO 160 (marketed by Evonik) which is precured sol-gel in an aqueous phase
  SICO-CLEAR bicomponent fluoroalkylsilane in a solvent phase.

Other types of coupling agent, such as organophosphonates, organophosphonic acids, organotitanates, organozirconates and organoaluminates may be envisaged. All these additives have the possibility of being grafted (like the silanes) on the surface of the glass frit.

For the case of an insulator exposed to the weather, a coating is preferred of the epoxide type ("epoxy" is a contraction of "epoxide") and notably systems based on a cycloaliphatic epoxy resin. This epoxide coating is preferably applied after silanization of the surface by an aminated silane of the A1100 or A1161 type from Osi-Momentive, or an epoxide silane of the Dynasylan GLYMO 3-glycidyloxypropyltrimethoxysilane type from Evonik. The epoxide is for example Araldite CY 184 (weight in epoxy equivalent of 5.8 to 6.1 equivalents/kg or, in an optimum manner, a 45%-5%-50% mixture of CY184+PY307+HY1235 of Huntsmann resin) which allows for easy application on account of its low viscosity at 25° C. (700 to 900 mPa·s) and a pot life greater than 3 days. Moreover, it ensures that the insulating properties are preserved over a period greater than 72 h in deionized water. This resin is cured with the aid of a cycloaliphatic anhydride hardener. For example Huntsmann Aradur HY 1235 gives excellent results. These resin/hardener products are generally used in ratios of 30/70, 40/60, 50/50, 60/40 or 70/30. The epoxy resin, hardener and catalyst are mixed in the chosen ratios. The organic formulation is applied by immersing the electrical insulator under vacuum or not under vacuum. The organic resin is then cured under pressure (autoclave) or not, by heat treatment (generally 80 to 160° C.). The viscosity of the organic formulation may be adjusted by using a reactive diluent. For the curing temperature, it is possible to go from 15° C. to 220° C.

An organic coating that is well suited to insulators exposed or not to the weather, is a polysilazane marketed under reference HTT 1800 by Clariant.

The glass frits and organic coatings used within the framework of the present invention are free from heavy metals, are compatible with each other, are compatible with the steel of inserts and the mineral filler (structure without large cavities or cracks after wet ageing) ensuring good electrical, mechanical and thermal performance, this after immersion for three days in deionized water, the test duration being recognized as being sufficient to guarantee long life greater than or equal to 20 years in service.

The glass used within the framework of the invention also finds a use as a leakproofing material, adhesive, sealing material, material for coating electronic components, notably for electronic display boards, in particular plasma screens (PDP), field emission displays (FED), vacuum fluorescent display (VFD), cathode ray tubes (CRT), in dielectric layers and insulating layers, and materials for producing Rib barriers, and microelectronic substrates. The glass according to the invention may also be used for materials for crystal electronic components packets and for magnetic heads with two cores and for the cursor and magnetic core, as well as for a low firing temperature enamel.

In the following examples, a determination was made:
of the molding temperature Tm by an experimental approach varying molding temperatures in 10° C. steps. The values indicated correspond to the values enabling yields of parts to be obtained greater than 90% (reject rate less than 10%) on the basis of a visual observation of the molding quality.
it should be noted that it is important to ensure that the temperature of the inserts (250° C. to 400° C.) as well as the temperature of the mold (290° C. to 450° C.) are kept to;
the period Di at the end of which the insulation resistance becomes less than 1 TΩ after immersion in deionized water. This insulation resistance is measured with the aid of a Chauvin Arnoux CA6547 MegOhmmeter under 2500V.

Table 1 indicates the formulations of glass frits for various examples and the results obtained for insulating compositions comprising 48% by weight of glass frit, 4% by weight of alumina and 48% by weight of mica. In all the examples, the PbO content in the frit was less than 0.011 mol %. The results are assembled in Table 1 in terms of the molding temperature (noted "Tm" and expressed in ° C.) and the immersion time in deionized water (noted Di and expressed in days).

Examples 1 to 4 illustrate the invention. The glasses used led to molding temperatures below 800° C. and satisfactory immersion times, of at least one hour, especially for examples 1 to 3 that had BaO contents greater then 20% and contained bismuth oxide. Examples 5 to 19 are comparative. Examples 20 to 22 gave excellent results with very high bismuth oxide contents. The current price of this oxide penalizes these compositions somewhat.

The subject of the present invention also relates to the production of insulators with a long creeping distance from the composition comprising glass and mica according to the invention. The term "creeping distance" is used to denote the developed distance (namely the surface profile following the contour) between the two planes of insulating material that are farthest apart of an insulator containing metal inserts. This parameter is important since it makes it possible to take account of the probability of the occurrence of partial discharges along the surfaces of the insulator. The creeping distance depends on the actual electric voltages and the peak electric voltages in the final use.

The subject of the present invention also relates to insulators molded from lead-free glass/mica compositions according to the invention having creeping distances as defined in table 2 below, the length of the creeping distance being always greater than the height of the insulator.

TABLE 2

| Min height mm | Max height mm | Min creeping distance mm | Max creeping distance mm |
| --- | --- | --- | --- |
| 35 | 50 | 45 | 85 |
| 50 | 60 | 65 | 250 |
| 60 | 90 | 120 | 300 |
| 90 | 110 | 130 | 350 |

Thus, the ratio of the creeping distance to the height of the insulator generally extends from 1.2 to 4. The invention thus makes it possible to obtain a ratio for the length of the creeping distance to the height of the insulator of at least 1.55, which is considered as particularly difficult to achieve. The "height of the insulator" is the distance of the line segment between two points of the insulator that are closest together and such that each of these points is a point in contact with the insulator as well as an insert (different from the other point) and the atmosphere. For a person skilled in the art, this is also the distance between the upper part and the lower part of the insulator. The creeping distance is the distance connecting these same points but while traveling over the surface of the insulator.

Glass compositions containing more than 15 mol % of bismuth oxide and, as illustrated by examples 20 to 22, give excellent results. They may be the subject of a divisional request for the same applications as those forming the object for claim 1. These bismuth-rich compositions comprise:
80 mol % of $Bi_2O_3$
15 to 80 mol % of $B_2O_3$
This bismuth-rich composition may also include silica and between 0 and 30 mol % of $SiO_2$.

The glass/mica compositions (+any mineral filler) according the invention may find a use as an insulator in at least one of following functions:
  support for brake rheostats,
  high voltage cable insulation (generally above 5 kV),
  power resistance support, has a very undulating surface in order to increase the length of its creeping distance, much longer than its height 4. Two points 5 and 6 have been shown that are close together so that each of these points is a point in contact with the insulator as well as an insert (different from the other point) and the atmosphere.

TABLE 1

| ex n° | SiO2 | BaO | B2O3 | Bi2O3 | ZnO | Li2O | Al2O3 | Na2O | MgO | K2O | CaO | SrO | ZnO + R2O + R'O | Tm (° C.) | Di (days) |
|---|---|---|---|---|---|---|---|---|---|---|---|---|---|---|---|
| 1 | 21.55% | 36.62% | 28.07% | 10.87% | 0.00% | 0.00% | 2.90% | 0.00% | 0.00% | 0.00% | 0.00% | 0.00% | 36.62% | 750 | 6 |
| 2 | 18.26% | 30.87% | 23.84% | 5.71% | 10.26% | 0.00% | 2.46% | 7.70% | 0.00% | 0.00% | 0.00% | 0.00% | 48.83% | 720 | 6 |
| 3 | 16.80% | 28.40% | 21.93% | 3.72% | 13.48% | 0.00% | 2.26% | 12.39% | 0.00% | 0.00% | 0.00% | 0.00% | 54.27% | 720 | 6 |
| 4 | 19.28% | 9.94% | 19.39% | 0.00% | 0.00% | 28.57% | 0.00% | 0.00% | 0.00% | 0.00% | 22.83% | 0.00% | 61.34% | 750 | 1 |
| 5 | 24.53% | 34.37% | 36.19% | 0.00% | 0.00% | 0.00% | 4.91% | 0.00% | 0.00% | 0.00% | 0.00% | 0.00% | 34.37% | 850 | 2 |
| 6 | 24.57% | 17.18% | 36.21% | 0.00% | 17.11% | 0.00% | 4.94% | 0.00% | 0.00% | 0.00% | 0.00% | 0.00% | 34.29% | 850 | 2 |
| 7 | 24.62% | 17.17% | 36.14% | 0.00% | 0.00% | 0.00% | 4.97% | 0.00% | 0.00% | 0.00% | 17.16% | 0.00% | 34.33% | 1000 | — |
| 8 | 43.62% | 0.09% | 13.13% | 0.00% | 18.38% | 0.00% | 1.51% | 18.50% | 0.07% | 0.04% | 0.12% | 0.13% | 37.33% | 1000 | — |
| 9 | 57.23% | 15.39% | 0.33% | 0.00% | 0.30% | 0.01% | 10.11% | 1.56% | 0.60% | 5.39% | 8.33% | 0.54% | 32.12% | 1000 | — |
| 10 | 56.82% | 0.03% | 11.34% | 0.00% | 1.13% | 0.04% | 7.41% | 4.87% | 0.65% | 2.58% | 12.64% | 2.34% | 24.28% | 1000 | — |
| 11 | 58.59% | 0.03% | 10.08% | 0.00% | 0.16% | 0.01% | 8.11% | 7.29% | 0.96% | 2.33% | 12.32% | 0.02% | 23.12% | 1000 | — |
| 12 | 60.44% | 0.02% | 10.51% | 0.00% | 0.47% | 0.75% | 8.26% | 3.11% | 1.91% | 1.71% | 11.46% | 1.30% | 20.73% | 1000 | — |
| 13 | 58.05% | 0.02% | 31.24% | 0.00% | 0.08% | 0.52% | 0.67% | 7.87% | 0.05% | 0.33% | 0.78% | 0.00% | 9.65% | 750 | 0.5 |
| 14 | 66.80% | 0.04% | 20.10% | 0.03% | 0.06% | 0.11% | 5.72% | 5.48% | 0.32% | 0.41% | 0.69% | 0.00% | 7.11% | 1000 | — |
| 15 | 39.19% | 3.34% | 29.80% | 0.00% | 0.16% | 4.83% | 6.05% | 1.06% | 2.28% | 0.28% | 12.51% | 0.13% | 24.59% | 870 | 1 |
| 16 | 48.36% | 0.03% | 24.01% | 0.00% | 0.00% | 0.02% | 3.98% | 19.13% | 0.05% | 2.53% | 1.84% | 0.00% | 23.60% | 800 | 0.5 |
| 17 | 37.87% | 0.00% | 36.38% | 0.00% | 0.00% | 0.00% | 4.34% | 0.00% | 0.00% | 0.00% | 21.41% | 0.00% | 21.41% | 900 | 0.5 |
| 18 | 18.00% | 30.00% | 34.00% | 4.00% | 14.00% | 0.00% | 0.00% | 0.00% | 0.00% | 0.00% | 0.00% | 0.00% | 44.00% | 850 | 0.5 |
| 19 | 15.00% | 30.00% | 34.00% | 4.00% | 14.00% | 0.00% | 3.00% | 0.00% | 0.00% | 0.00% | 0.00% | 0.00% | 44.00% | 850 | 0.5 |
| 20 | 0.00% | 0.00% | 68.19% | 31.81% | 0.00% | 0.00% | 0.00% | 0.00% | 0.00% | 0.00% | 0.00% | 0.00% | 0.00% | 700 | 3 |
| 21 | 0.00% | 0.00% | 27.91% | 72.09% | 0.00% | 0.00% | 0.00% | 0.00% | 0.00% | 0.00% | 0.00% | 0.00% | 0.00% | 670 | 10 |
| 22 | 23.66% | 0.00% | 21.53% | 26.69% | 15.29% | 0.00% | 0.00% | 11.47% | 0.00% | 0.00% | 0.00% | 0.00% | 26.76% | 720 | 10 | insulator and support for electric power motor,
connecting terminal for an electric motor,
cage insulation receiving the brushes of an electric motor,
circuit breaker control for electric pylon,
electricity supply cable support,
spacers or insulating support for applying HF (high frequency),
insulation for industrial current pick-up rail,
support or connection for heating element,
support or insulation for an electric current pick-up device from the 3$^{rd}$ rail for a vehicle run on electrical power (subway, street car, train etc),
insulation for a power rectifier assembly,
insulation for high power switch,
transformer connecting terminal,
wall bushing for transmission of an electric current,
support or insulation for a pantograph system,
gas igniters,
oxygen probes,
pressure and/or temperature sensor,
carrier for an electric filament (generally made of tungsten),
plate in laboratory equipment,
equipment (insulator) for electron gun,
thermal and/or electrical systems in an automobile (such as temperature measuring sensors),
aeronautical de-icing systems (protection of an electrical resistance),
corona discharge systems,
high temperature lamp systems (for example as a cap for a halogen lamp),
support for fuel cells,
parts in contact with glass that may be hot, such as at its softening temperature, notably during glass bending.

FIG. 1 shows an insulator with a long creeping distance. This insulator has two orifices 1 and 2 in which two metal inserts may be screwed. The outer surface 3 of the insulator

The invention claimed is:

1. A composition, comprising:
  mica; and
  a glass comprising:
    10 to 30 mol % of SiO$_2$;
    20 to 40 mol % of BaO;
    15 to 30 mol % of B$_2$O$_3$;
    a total sum of 15 to 65 mol % of zinc oxide, an alkali metal oxide, and an alkaline earth oxide.

2. The composition of claim 1, further comprising:
  0 to 15% by weight of a mineral filler with a Tg above 600° C.,
  wherein a content of the glass in the composition is in a range from 35 to 75% by weight, and a content of the mica in the composition is 20 to 65%by weight, each weight percentage being based on a total weight of the composition.

3. The composition of claim 2, wherein the mineral filler is alumina, and
  wherein a content of the glass in the composition is in a range from 45 to 65% by weight, a content of the mica in the composition is in a range from 25 to 55% by weight, and a content of the alumina in the composition is in a range from 4 to 12% by weight, each weight percentage being based on a total weight of the composition.

4. The composition of claim 1, wherein the glass further comprises from 0.5 to 15 mol% of Bi$_2$O$_3$.

5. The composition of claim 4, wherein the glass comprises from 1 to 12 mol% of Bi$_2$O$_3$ oxide.

6. The composition of claim 1, wherein the glass comprises 5 to 15 mol% of Na$_2$O.

7. The composition of claim 1, wherein the glass further comprises 1 to 5 mol% of Al$_2$O$_3$.

8. The composition of claim 1, wherein the glass further comprises less than 0.011 mol% of PbO.

9. The composition of claim 7, wherein the glass comprises less than 15 mol% of Li$_2$O.

10. A composition, comprising:
mica; and
a glass comprising:
   10 to 30 mol% of $SiO_2$;
   5 to 40 mol% of BaO;
   15 to 30 mol% of $B_2O_3$;
   5 to 15 mol% of $Na_2O$;
   a total sum of 15 to 65 mol% of zinc oxide, an alkali metal oxide, and an alkaline earth oxide.

11. The composition of claim 10, further comprising:
0 to 15% by weight of a mineral filler with a Tg above 600° C.,
wherein a content of the glass in the composition is in a range from 35 to 75% by weight, and a content of the mica in the composition is 20 to 65% by weight, each weight percentage being based on a total weight of the composition.

12. The composition of claim 11, wherein the mineral filler is alumina, and wherein a content of the glass in the composition is in a range from 45 to 65% by weight, a content of the mica in the composition is in a range from 25 to 55% by weight, and a content of the alumina in the composition is in a range from 4 to 12% by weight, each weight percentage being based on a total weight of the composition.

13. The composition of claim 10, wherein the glass further comprises from 0.5 to 15 mol% of $Bi_2O_3$.

14. The composition of claim 13, wherein the glass comprises from 1 to 12 mol% of $Bi_2O_3$ oxide.

15. The composition of claim 10, wherein the glass further comprises 1 to 5 mol% of $Al_2O_3$.

16. The composition of claim 10, wherein the glass further comprises less than 0.011 mol% of PbO.

17. The composition of claim 15, wherein the glass comprises less than 15 mol% of $Li_2O$.

* * * * *